United States Patent
Jakob et al.

(10) Patent No.: US 6,860,385 B2
(45) Date of Patent: Mar. 1, 2005

(54) BELT CONVEYOR FOR AN INTERMEDIATE TOBACCO STORE, IN PARTICULAR A MIXING BOX

(75) Inventors: Manfred Jakob, Geesthacht (DE); Horst-Udo Christ, Hamburg (DE)

(73) Assignee: Hauni Primary GmbH, Hamburg (DE)

(*) Notice: Subject to any disclaimer, the term of this patent is extended or adjusted under 35 U.S.C. 154(b) by 0 days.

(21) Appl. No.: 10/320,727

(22) Filed: Dec. 17, 2002

(65) Prior Publication Data

US 2003/0136648 A1 Jul. 24, 2003

(30) Foreign Application Priority Data

Dec. 19, 2001 (DE) .......................................... 101 62 718

(51) Int. Cl.[7] .............................................. B65G 15/30
(52) U.S. Cl. ...................................... 198/846; 198/847
(58) Field of Search ................................ 198/846, 847, 198/848, 817

(56) References Cited

U.S. PATENT DOCUMENTS

| 1,346,650 A | * | 7/1920 | Hendrickson ................ 198/846 |
| 1,362,651 A | | 12/1920 | Towns |
| 3,252,691 A | * | 5/1966 | Getzin et al. ................ 198/846 |
| 3,526,207 A | * | 9/1970 | Nadelson ..................... 198/848 |
| 4,416,368 A | | 11/1983 | Muramatsu et al. |
| 4,635,788 A | * | 1/1987 | McDonald .................... 198/848 |

FOREIGN PATENT DOCUMENTS

| GB | 797165 | 6/1958 |
| GB | 919252 | 2/1963 |
| NL | 8602293 | 12/1986 |

* cited by examiner

Primary Examiner—James R. Bidwell
(74) Attorney, Agent, or Firm—Venable LLP; Robert Kinberg; Catherine M. Voorhees

(57) ABSTRACT

A belt conveyor includes a strut adapted to be connected to at least two parallel arranged drive elements. At least one belt is positioned on the cross strut between the two drive elements. A detachable connecting mechanism detachably connects the belt to the cross strut.

25 Claims, 2 Drawing Sheets

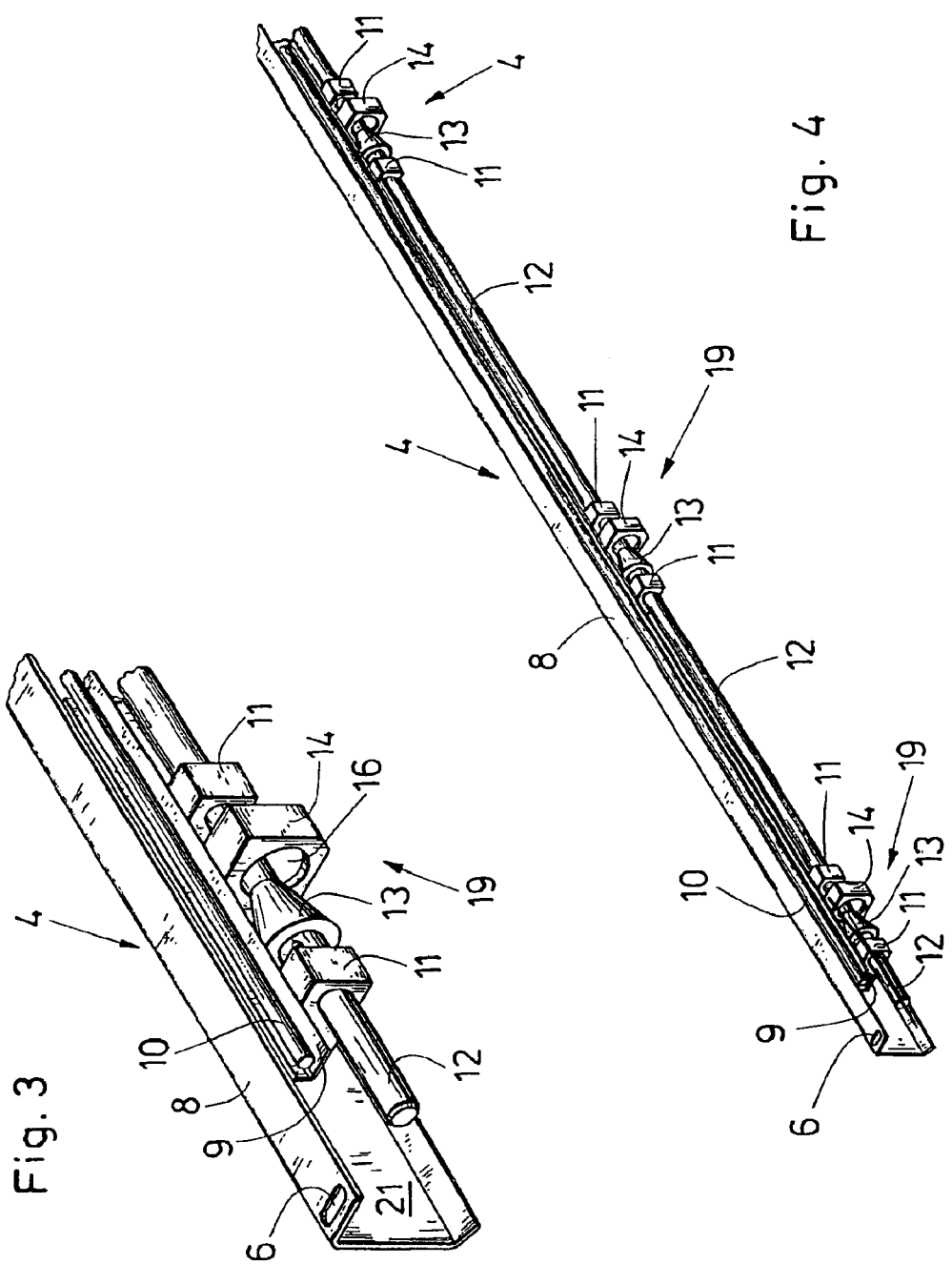

BELT CONVEYOR FOR AN INTERMEDIATE TOBACCO STORE, IN PARTICULAR A MIXING BOX

CROSS-REFERENCE TO RELATED APPLICATION

This application claims the priority of German Patent Application No. 101 62 718.1 filed Dec. 19, 2001, the disclosure of which is incorporated herein by reference.

BACKGROUND OF THE INVENTION

The invention relates to a belt conveyor for an intermediate tobacco store, for example, a mixing box. Such a belt conveyor includes least two parallel-arranged drive elements, which are connected by at least one cross strut. A belt is arranged between the drive elements.

The invention furthermore relates to a cross strut for a belt conveyor of the type described above.

In addition, the invention relates to an intermediate tobacco store, in particular a mixing box, as well as a conveying system for an installation in the tobacco-processing industry.

Mixing boxes supplied with different types of tobacco are used in the cigarette production. The mixing ensures that the finished tobacco product has a uniform mixing quality and thus a constant, homogeneous tobacco mixture.

A belt conveyor is arranged on the bottom of the intermediate store to remove the mixed tobacco from the mixing box, having a width of up to 5 m and a length of up to 50 m. The conveyor further transports the tobacco mass, stored in the intermediate store, to a metering apparatus. The belt conveyor is moved with the aid of two conveyor chains, wherein the conveyor chains are connected via tie-bars. A conveyor belt on which the layers of tobacco are disposed is attached to the tie-bars. The belt is securely riveted to the tie-bars, such that it can convey the tobacco good.

The disadvantage of existing conveyor belts is that tobacco and other particles heavily soil the belts. The belts are difficult to clean because of the secure rivet connection between the tie-bars and the belts. As a result, meeting the requirements set by law for cleanliness is very difficult.

SUMMARY OF THE INVENTION

Thus, it is an object of the present invention to facilitate and/or make possible the cleaning of belt conveyors in mixing boxes.

The above and other objects are achieved according to the invention by the provision of a belt conveyor, comprising: at least one cross strut adapted to be connected to at least two parallel arranged drive elements; at least one belt positioned on the at least one cross strut for being between the two drive elements; and detachable connecting means for detachably connecting the belt to at least one of the cross struts.

As a result of the detachable connection between belt and cross strut, the belt can be replaced quickly and easily. If the belt on the conveyor is dirty, the belt can be replaced immediately with a clean belt by using just a few manual operations. In contrast to the prior art, it is not necessary to first separate the secure riveting between belt and tie-bar and/or cross strut in a laborious operation.

At least one cross strut is advantageously provided with a clamping device for the belt. The belt can be attached easily and reliably to the cross strut and/or inside the cross strut with the aid of the clamping device. Once the clamping device is released, the belt can be removed. Following the installation of a new, cleaned belt, the clamping device is again clamped in place.

According to one exemplary embodiment, the clamping device is formed by at least two profiles, or sections, of the cross strut, which preferably move relative to each other. The cross strut not only functions to connect the drive elements but additionally serves to clamp in the belt. In particular, a type of clamping claw is realized for the belt with this mutual profile movement relative to one anther.

At least one gap is advantageously provided in the cross strut, into which the belt can be inserted so that the conveyor belt has a flat surface without unevenness or raised areas on the cross struts.

A clamping part can be inserted into the gap to further improve the clamping effect of the cross strut. The clamping part has the effect of maintaining a secure connection between belt and cross strut if the belt experiences strong mechanical stress. In that case, the clamping part has the effect of and functions in the manner of a blocking element, so that the belt and/or the clamping part are held in place during the stress and cannot detach themselves.

In an exemplary embodiment the clamping part is surrounded at least in part by the belt.

The clamping part can be held in place and positioned reliably in the cross strut by a holding device for the clamping part formed in the cross strut.

A belt tensioning device is preferably provided in the cross strut for tensioning the new belt following a replacement. The tensioning device permits a uniform and tight tensioning of the belt as well as a re-tensioning while in use, so that the belt conveyor can be operated with a constantly tensioned belt.

It is particularly preferable if the tensioning device includes at least one tensioning cone. The belt can be tensioned further through simple axial translation of the cone in a longitudinal direction. In addition to the tensioning function, the tensioning device simultaneously also functions to activate the clamping device.

According to one advantageous modification, the tensioning cone can be arranged on a tensioning rod.

In addition, conveyor chains are advantageously used as drive elements for the belt conveyor. The conveyor chains are driven, for example, with the aid of a toothed wheel. Of course, it is also possible to provide drive belts as drive elements.

According to another aspect of the invention there is provided a cross strut for a belt conveyor in which at least two drive elements of the belt conveyor are connectable with the aid of the cross strut and a conveyor belt is arranged between the drive elements, wherein according to the invention the cross strut includes at least one detachable connecting means for detachably connecting the cross strut to the conveyor belt.

According to one preferred embodiment, a clamping device functions as a mechanism for the detachable connection.

Additional advantageous embodiments of the cross strut follow from the above-described belt conveyor, to which reference is explicitly made in order to avoid redundancy.

According to yet further aspects of the invention, there is provided a combination of an intermediate tobacco store and the invention belt conveyor, as well as a method for conveying tobacco from a tobacco store or more generally in an installation in the tobacco processing industry, which method includes utilizing the inventive belt conveyor as described above.

BRIEF DESCRIPTION OF THE DRAWINGS

In the following, the invention is explained in further detail with the aid of an exemplary embodiment shown in the Figures, without limiting the general inventive idea.

FIG. 3 is a perspective, detailed view of a tensioning device according to the invention FIG. 4 is a perspective, partial view of a cross strut according to the invention.

DETAILED DESCRIPTION OF THE INVENTION

Figure 1:
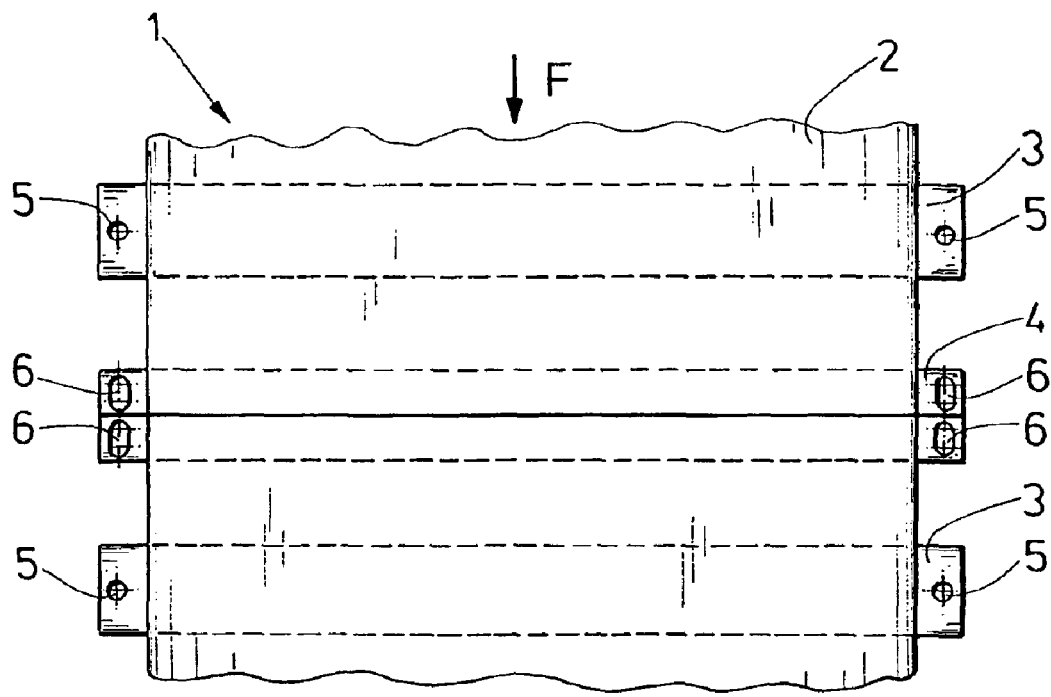
FIG. 1 is a plan view of a belt conveyor segment according to the invention

Identical elements and parts are given the same reference numerals in the following Figures, wherein the respective elements and the parts will not be introduced again. The figures illustrate an exemplary embodiment of the invention for purposes of explaining the principles of the invention, and it is specifically not intended to limit the scope of the invention to the exemplary embodiment, which scope is defined by claims at the end of the application.

FIG. 1 shows a plan view of an embodiment of a segment of a belt conveyor 1 employing the principles of the invention. Belt conveyor 1 comprises a belt 2 that is conveyed in a conveying direction F. Cross struts 3, 4 underneath the belt 2 are also conveyed in the conveying direction F. Cross struts 3, 4, project out on both sides of belt 2 and are provided at their ends on both sides with circular holes 5 and/or elongated holes 6. Screws or other fastening means can be inserted into the holes 5, 6, so that the cross struts 3, 4 are connected respectively on each side with a drive element, such as a conveying chain that is not shown herein for ease of illustration.

The conveying chains on both sides of the cross struts 3, 4 are transported, for example, with the aid of gearwheels and a motorized drive, in conveying direction F. The conveying chains and/or belt conveyor 1 form a closed, meaning endless, system arranged on the bottom of a tobacco mixing box.

Figure 2:
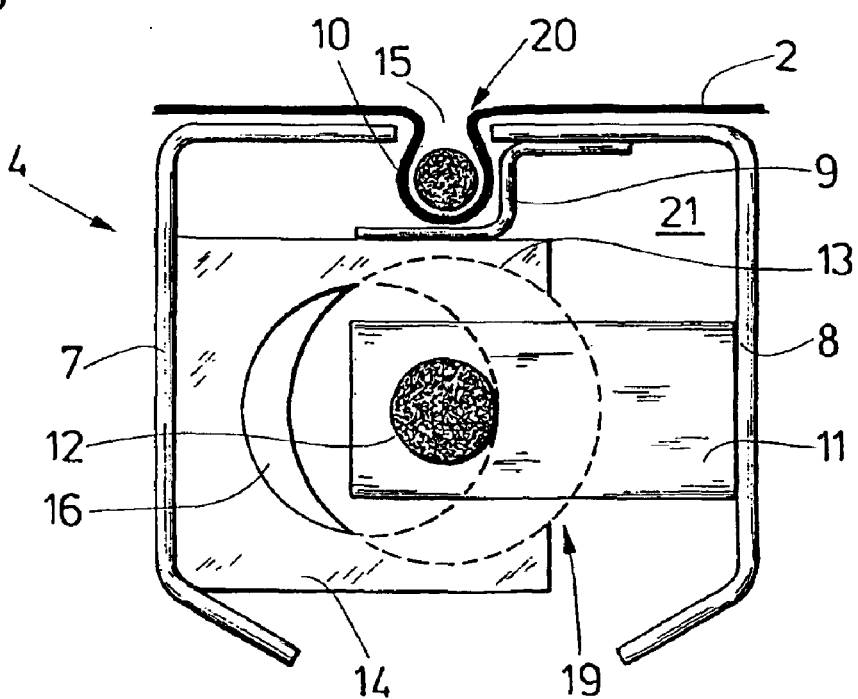
FIG. 2 is a cross-sectional view of a cross strut according to the invention.

Whereas the belt 2 rests on the cross strut 3, the belt 2 is connected securely and detachably with cross strut 4 by a claming device 20 as shown in FIG. 2 and as described below.

FIG. 2 shows a schematic cross section of an exemplary embodiment of cross strut 4 having a claming device 20 according to the invention. Cross strut 4 includes two angled profiles or sections 7, 8 that can move toward each other and clamp in the placed-on belt 2 in the manner of clamping claws. Angled profiles 7, 8 of cross strut 4 are designed such that the cross strut 4 has a gap 15 on the top, that is the side facing belt 2. Gap 15 extends over the complete length of cross strut 4.

Corresponding to the position of movable profiles 7, 8, gap 15 is opened for inserting belt 2 into cross strut 4. After belt 2 is inserted, the width of gap 15 is reduced. Once the belt 2 is inserted, a rod 10 is inserted into gap 15 to improve the clamping down of belt 2. In the process, belt 2 at least partially surrounds clamping rod 10 in the manner of a loop. A holder 9 is provided on the underside of profile 8, below gap 15, to position clamping rod 10 and belt 2 in gap 15. Thus, clamping rod 10 cannot fall into cross strut 4.

Angled profiles 7, 8 form an interior space or cavity 21 inside cross strut 4, in which a tensioning device 19 is arranged. Tensioning device 19 comprises a tensioning rod 12 that is displaceable in a longitudinal axial direction and is held in placed with several holders 11 that are connected to angled profile 8. A holding part 14 with a bore 16, which is connected to the other profile 7 of cross strut 4, is formed between two successively arranged holders 11. In addition, a cone 13 is arranged axially symmetrical on tensioning rod 12, between a holder 11 and holding part 14. Tensioning rod 12 extends through bore 16 of holding part 14. Furthermore, the center axis of tensioning rod 12 is parallel displaced, that is offset, with respect to the center axis of bore 16.

Gap 15 is narrowed with the aid of the horizontal legs of angled profiles 7, 8 in order to clamp down belt 2. For a reliable clamping, the width of gap 15 must be smaller than the sum resulting from the diameter of clamping rod 10 and twice the thickness of belt 2.

The clamp is released and gap 15 widened to remove belt 2 from cross strut 4. Clamping rod 10 can then be removed, so that the connection between cross strut 4 and belt 2 is broken again. Angled profiles 7, 8 of cross strut 4 are moved relative to each other to secure or release the clamping.

FIG. 3 shows a partial perspective view of a cross strut 4. Angled profiles 7, 8 (FIG. 2) are moved toward each other to clamp down and tension belt 2. Angled profile 7 is omitted in the present representation to obtain a clearer view.

Tensioning devices 19 are formed inside interior space 21 (see FIG. 2) of cross strut 4. Tensioning rod 12 of tensioning device 19 is arranged parallel to gap 15 and is positioned with holders 11 to be displaceable. Tensioning cone 13 is furthermore provided on tensioning rod 12, between two holders 11. Holding part 14 that is connected to angled profile 7 (see FIG. 2) is formed between the tapered end of tensioning cone 13 and a holder 11. Holders 11 are immovably connected to angled profile 8 of cross strut 4. Holding part 14, which is connected to angled profile 7 that is not shown herein, contains bore 16 through which tensioning rod 12 extends.

In addition, the axis for tensioning rod 12 and the centerpoint axis for bore 16 of holding part 14 are arranged axially parallel and displaced from one another. During the longitudinal axial displacement of tensioning rod 12, the distance between angled profiles 7, 8 of cross strut 4 (see FIG. 2) can be varied and adjusted since the outside surface of cone 13 enters bore 16 during displacement of cone 13 and finally comes in contact with the inside of bore 16. As a result of the axial parallel arrangement of the rotational axis for cone 13, relative to the center point axis of bore 16, the distance can be varied continuously since the spacing between angled profiles 7, 8 changes during the translational movement of cone 13.

Owing to tensioning device 19, belt 2 can be clamped in and additionally tensioned with the aid of cross strut 4. For this, the tensioning rod is secured, for example with a screw, after cone 13 is displaced and/or enters bore 16.

FIG. 4 shows a perspective overview of a segment of cross strut 4 (see FIG. 3). In this representation, several tensioning devices 19 are arranged at predetermined, preferably equidistant, distances along tensioning rod 12. Thus, belt 2 that is connected to cross strut 4, can be clamped down and/or tensioned uniformly across the total length of cross strut 4.

The invention makes it possible in a reliable and easy manner to connect a belt with a cross strut of a belt conveyor.

As a result of the detachable connection between belt and strut, the belt can be removed easily from the strut and can be cleaned. A clean belt can then be connected easily to the connecting struts.

The invention has been described in detail with respect to exemplary embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. A belt conveyor, comprising:
   at least one cross strut adapted to be connected to at least two parallel arranged drive elements;
   at least one belt positioned on the at least one cross strut for being between the two drive elements; and
   connecting means for detachably connecting the belt to at least one of the cross struts wherein the connecting means comprises a clamping device for the belt and the at least one of the cross struts comprises at least two profiles that can be moved relative to each other and which constitute components of the clamping device.

2. The belt conveyor according to claim 1, wherein the connecting means includes at least one gap in the at least one of the cross struts into which the belt is insertable.

3. The belt conveyor according to claim 2, wherein the connecting means further includes a clamping part that is insertable into the gap.

4. The belt conveyor according to claim 3, wherein the clamping part is insertable into the gap at least partially surrounded by the belt.

5. The belt conveyor according to claim 4, wherein the connecting means includes a holding device for the clamping part.

6. The belt conveyor according to claim 5, wherein the connecting means further includes a tensioning device disposed in the at least one of the cross struts for adjusting tension of the detachable connecting means on the belt.

7. The belt conveyor according to claim 6, wherein the tensioning device comprises at least one tensioning cone.

8. The belt conveyor according to claim 7, wherein tensioning device includes a tensioning rod and the tensioning cone is arranged on the tensioning rod.

9. The belt conveyor according to claim 1, forming a combination with the drive elements, and wherein the drive elements comprise conveyor chains.

10. In a cross strut for a belt conveyor in which at least two drive elements of the belt conveyor are connectable with the aid of the cross strut and a conveyor belt is arranged between the drive elements, the improvement wherein:
    the cross strut includes at least one connecting means for detachably connecting the cross strut to the conveyor belt wherein the at least one connecting means comprises a clamping device and the cross strut comprises at least two profiles that can be moved relative to each other and which constitute components of the clamping device.

11. The cross strut according to claim 10, wherein the connecting means includes at least one gap in the cross strut into which the belt is insertable.

12. The cross strut according to claim 11, wherein the connecting means includes a clamping part that is insertable into the gap.

13. The cross strut according to claim 12, wherein the clamping part is insertable into the gap at least partially surrounded by the belt.

14. The cross strut according to claim 12, wherein the connecting means comprises a holding device for the clamping part.

15. The cross strut according to claim 10, wherein the connecting means includes a tensioning device inside the cross strut for adjusting tension of detachable connecting means on the belt.

16. The cross according to claim 15, wherein the tensioning device includes at least one tensioning cone.

17. The cross strut according to claim 16, wherein the tensioning device includes a tensioning rod and the tensioning cone is arranged on the tensioning rod.

18. A combination comprising an intermediate tobacco store and at least one belt conveyor according to claim 1 for conveying tobacco from the intermediate tobacco store.

19. A method of conveying tobacco in an installation in the tobacco processing industry, comprising utilizing the belt conveyor according to claim 1 for conveying tobacco in said installation in the tobacco processing industry.

20. A method of conveying tobacco from an intermediate tobacco store, comprising utilizing the belt conveyor according to claim 1 for conveying tobacco at said intermediate tobacco store.

21. In an arrangement for conveying tobacco in an installation in the tobacco processing industry in which at least one cross strut is adapted to be connected to at least two parallel arranged drive elements and at least one belt is positioned on the at least one cross strut for being between the two drive elements, a method for fixing the at least one belt to one of the cross struts, comprising:
    detachably connecting the belt to said one cross strut wherein the connecting step includes clamping the belt to said one cross strut; and
    forming said one cross strut from at least two profiles that can be moved relative to each other to define an adjustable gap in which the belt is insertable for being clamped between the two profiles.

22. The method according to claim 21, including inserting a clamping part in the gap so that the belt at least partially surrounds the clamping part.

23. The method according to claim 22, including providing a holding device for holding the clamping part when the clamping part is inserted in the gap.

24. The method according to claim 23, including adjusting the tension of the clamping on the belt by adjusting a width of the gap between the profiles.

25. A conveyor for moving a belt which is easily installed on and removed from the conveyer, comprising:
    at least one cross strut adapted to be connected to at least two parallel arranged drive elements, said cross strut including clamping means having a variable width gap for receiving the belt, said clamping means closing the gap to grip the belt and support it on said cross strut, and opening the gap to permit the belt to be easily removed from the conveyer.

* * * * *